United States Patent [19]

Freimuth et al.

[11] 4,436,027
[45] Mar. 13, 1984

[54] STRIPPER BAR FOR ROLL BALING MACHINE

[75] Inventors: John H. Freimuth, New Holland; Willis R. Campbell, Ephrata, both of Pa.

[73] Assignee: Sperry Corporation, New Holland, Pa.

[21] Appl. No.: 372,778

[22] Filed: Apr. 28, 1982

[51] Int. Cl.³ .............................................. B30B 5/04
[52] U.S. Cl. .................................... 100/88; 100/174; 56/341
[58] Field of Search ................... 100/88, 89, 5, 174; 56/364, 341, 342, 343

[56] References Cited

U.S. PATENT DOCUMENTS

| 1,673,921 | 6/1928 | Sharp | 100/174 |
| 2,592,269 | 4/1952 | Getz | 100/174 |
| 3,125,948 | 3/1964 | Redding | 100/174 X |
| 3,979,892 | 9/1976 | Kucera | 56/341 |
| 4,155,298 | 5/1979 | Gaeddert et al. | 56/341 |
| 4,240,339 | 12/1980 | Simonis | 100/88 X |

OTHER PUBLICATIONS

Operator's Manual OM-E61920 (issue H7), John Deere Model 510 Round Baler, 1977, p. 20, "Adjusting Smooth Roll Scraper".

Primary Examiner—Peter Feldman
Attorney, Agent, or Firm—Darrel F. Marquette; Larry W. Miller; Frank A. Seemar

[57] ABSTRACT

In a roll baling machine having a floor roller and a bale forming apron, a stripper bar is provided to remove crop material from the floor roller and thereby minimize the amount of crop material lost between the floor roller and the apron while baling.

5 Claims, 3 Drawing Figures

STRIPPER BAR FOR ROLL BALING MACHINE

BACKGROUND AND SUMMARY OF THE INVENTION

This invention relates generally to roll baling machines typically referred to as "round balers" which form cylindrical roll bales of crop material.

The present invention is intended for use on a roll baling machine having a frame, a floor roller rotatably supported on the frame, and bale forming means supported on the frame cooperating with the floor roller for forming a roll bale of crop material. Specifically, the present invention provides a stripper bar mounted on the frame for removing a crop material from the floor roller during bale formation. This serves to minimize the amount of crop material lost from the machine between the floor roller and the bale forming means during bale formation.

DESCRIPTION OF THE PREFERRED EMBODIMENT

Figure 1:
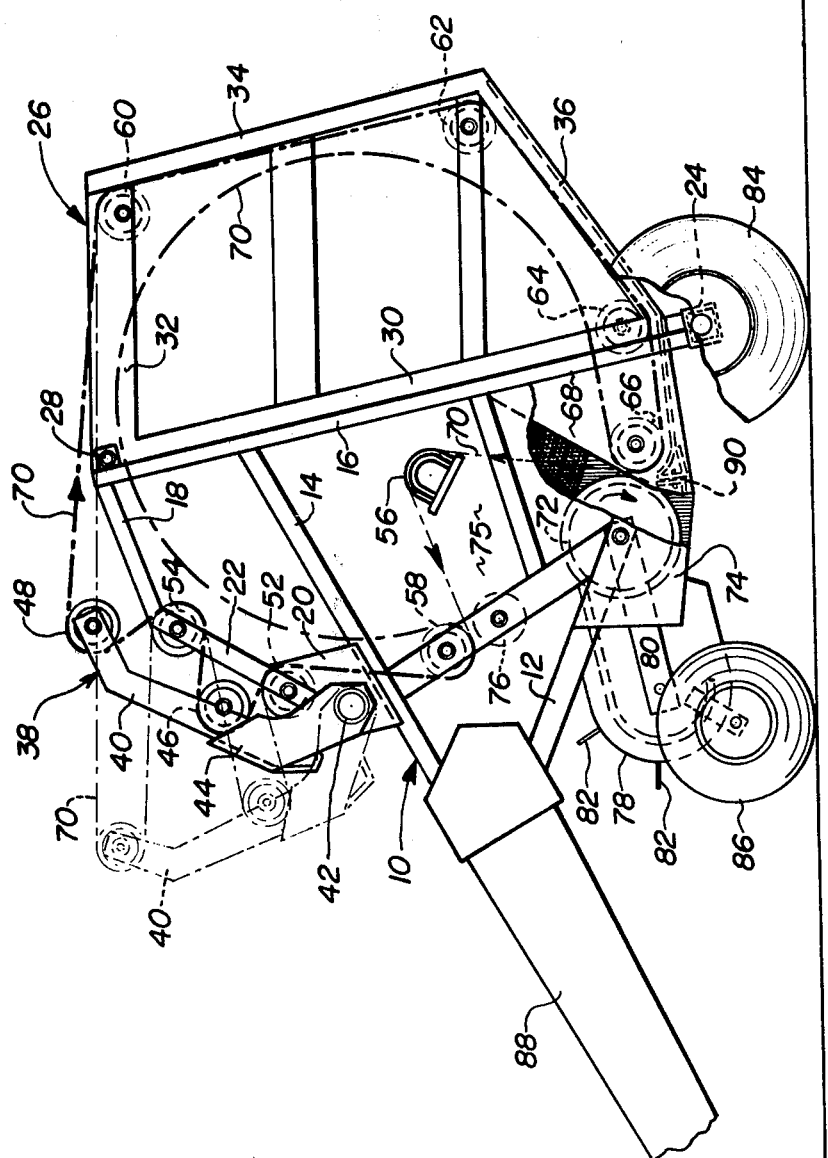
FIG. 1 is a side elevation view of a roll baling machine embodying the preferred embodiment of the stripper bar of the present invention.

Referring to FIG. 1, the roll baling machine embodying the preferred embodiment of the present invention includes a base frame 10 having opposite sides each formed generally of frame members 12,14,16 rigidly connected in a triangular configuration with side plates substantially covering the space therebetween. Each side of the base frame 10 includes an upper section, which consists of a frame member 18 rigidly connected to the frame member 16, a bracket 20 rigidly connected to frame member 14, and a frame member 22 rigidly connected between the frame member 18 and the bracket 20. A plate is connected to and covers the space between the frame members 14,16,18 and 22. A frame member 24 extends transversely of the machine and is pivotally connected at 28 to the base frame 10 by suitable bearings. The rear frame 26 has opposite sides each formed generally of frame members 30,32,34,36 rigidly connected in a substantially trapezoidal configuration with side plates substantially covering the space therebetween. Other frame members (not shown) extend transversely of the machine and connect the opposite sides of the base frame 10 and the opposite sides of the rear frame 26. In FIG. 1, the forward end of the machine is to the left and the rearward end thereof is to the right.

The rear frame 26 is pivotally movable from the lower position shown in FIG. 1 to an upper position (not shown) by conventional means such as hydraulic cylinders (not shown) mounted at the sides of the machine and connected between the base frame 10 and the rear frame 26.

An arm assembly 38 is rotatably mounted on the base frame 10 for rotational movement between a forward position shown in phantom lines in FIG. 1 and a rearward position shown in full lines in FIG. 1. The arm assembly 38 includes arms 40 disposed inboard the sides of the machine. The arms 40 are rigidly connected to a cross tube 42 by bracket members 44. The cross tube 42 is rotatably mounted in suitable bearing members carried by the brackets 20 on the opposite sides of the base frame 10. The arm assembly 38 is normally urged toward its forward position preferably by conventional means such as extension or compression springs (not shown) connected between the arm assembly 38 and the base frame 10.

Figure 2:
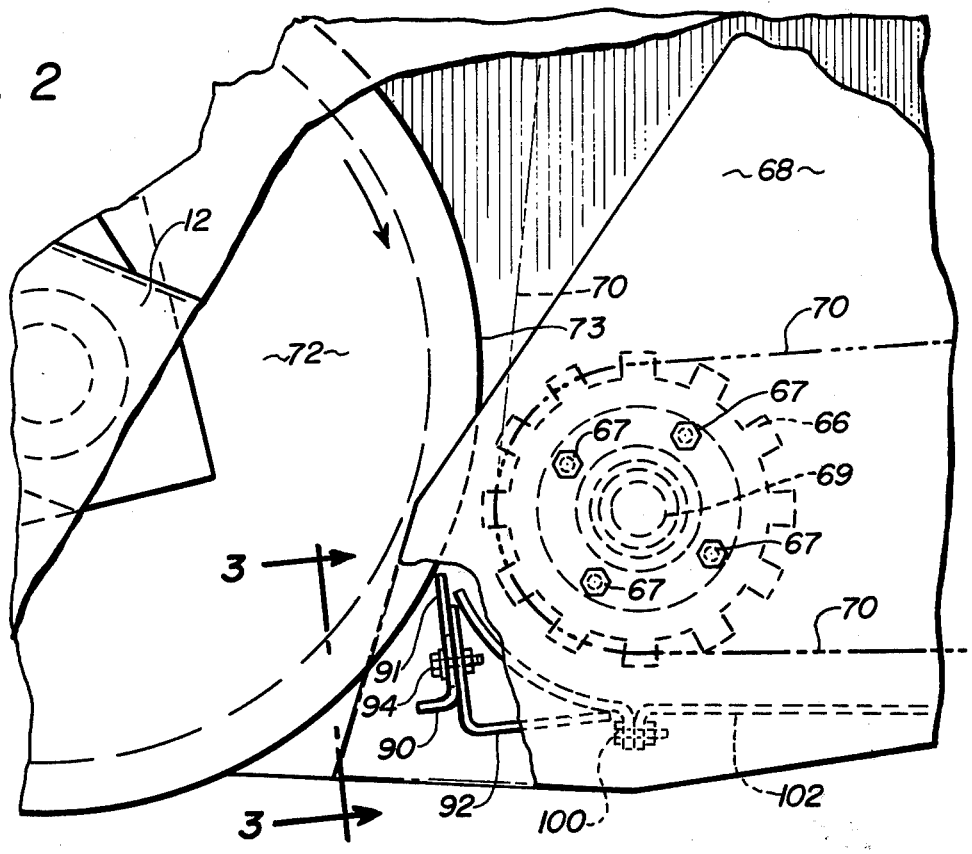
FIG. 2 is an enlarged view of a portion of the roll baling machine of FIG. 1 showing the stripper bar.
Figure 3:
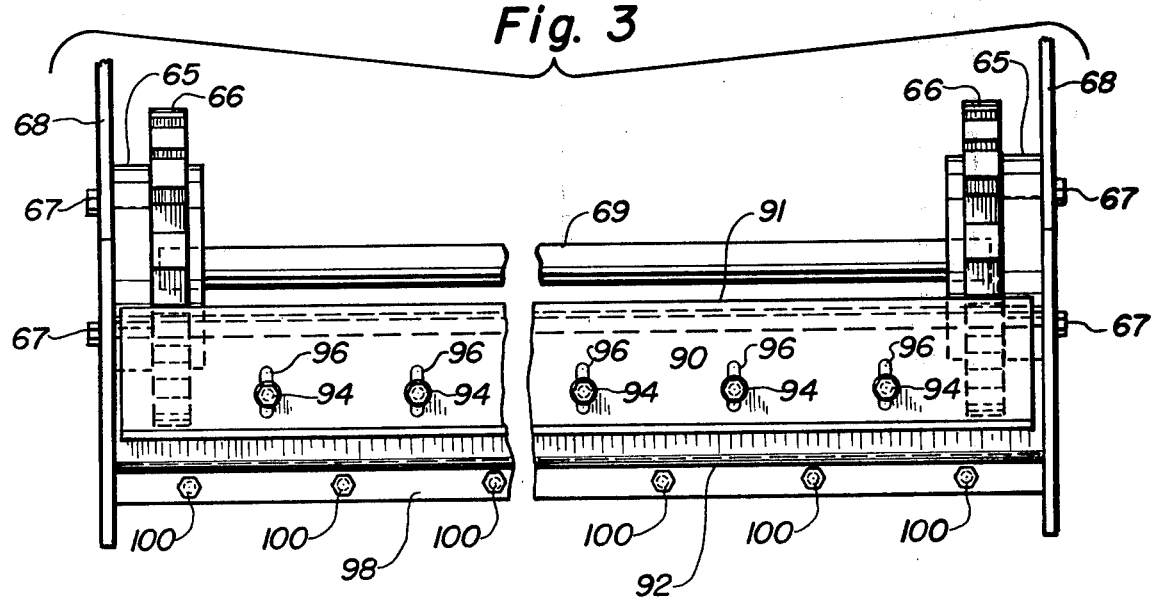
FIG. 3 is a section view taken along lines 3-3 in FIG. 2.

The arm assembly 38 carries rotatable guide members 46 and 48 on its arms 40. The base frame 10 supports rotatable guide members 52,54 and cam guide members 56 inboard its opposite sides. Preferably, the cam guide members 56 are of the known type disclosed in U.S. Pat. No. 3,901,007 and designated therein by the numeral "118". Sprockets 58 are provided inboard the opposite sides of the base frame 10 and are fixed on a shaft that is rotatably mounted in suitable bearings on the base frame 10. The rear frame 26 supports rotatable guide members 60,62,64,66 inboard its opposite sides. The guide members 66 are carried on brackets 68 projecting from and connected to the frame members 30 of the rear frame 26. As seen in FIGS. 2 and 3, the guide members 66 are rotatably mounted on circular blocks 65 that are secured by bolts 67 to the brackets 68. The guide members 66 are interconnected by a shaft 69.

A flexible bale forming apron 70 is movably supported on the aforementioned guide members and sprockets. The apron 70 is preferably formed of a pair of endless link-type chains connected at spaced intervals by transverse bars or slats. The apron chains 70 extend around and engage the various guide members and the sprockets 58. This apron 70 may be of the known type disclosed in U.S. Pat. No. 3,901,007 and designated therein by the numberal "82".

A floor roller 72 extends transversely of the machine and is rotatably supported by brackets 74 on the opposite sides of the base frame 10. Preferably, the floor roller 72 consists of a hollow metal drum with a relatively smooth coating or layer of rubber applied to its outer surface. When the machine is empty, the upper surface of the floor roller 72 cooperates with a course of the apron 70 that extends upwardly and rearwardly from the guide members 66 over the cam guide members 56 and then downwardly and forwardly to the sprockets 58 to define an expandable bale chamber 75 having an initial wedge shape in side elevation. In this initial wedge shape, the forward end of the bale chamber 75 is narrower than the rearward end thereof. A stripper roller 76, preferably rubber coated, extends transversely of the machine and is rotatably supported on the opposite sides of the base frame 10. The stripper roller 76 is positioned at the forward end of the bale chamber 75 in close proximity to the apron 70.

A pickup header 78 extends transversely of the machine and is supported by brackets 80 on the opposite sides of the base frame 10. The pickup header 78 is preferably of conventional type having a series of projecting fingers 82 for engaging and picking up windrowed crop material. A pair of wheels 84 mounted on the opposite sides of the base frame 10 support the machine. The wheels 84 are mounted on spindles which are connected to the frame member 24. Another pair of wheels 86 are mounted to the brackets 80 to provide support primarily for the pickup header 78. A tongue 88 is provided on the forward end of the base frame 10 for connection to a tractor.

The machine includes drive means (not shown) adapted for connection to the power take off unit (PTO) of a tractor. Referring to FIG. 1, rotary driving power will be delivered from the tractor PTO in a known manner to cause rotation of the sprockets 58, the floor roller 72, the stripper roller 76, and the pickup header fingers 82 in the same direction. Rotation of the sprockets 58 will drive the apron chains thereby propelling the apron 70 around the various guide members in the base frame 10 and the rear frame 26 in the direction and along the path indicated. Preferably, the peripheral speed of the floor roller 72 should be equal to or slightly higher than the speed of the apron 70. This will tend to keep a roll of crop material toward the rearward end of the machine during formation.

As the machine is pulled across a field by a tractor, the pickup header fingers 82 engage, pick up and deliver windrowed crop material onto the upper surface of the rotating floor roller 72 in the bale chamber 75. The crop material is carried upwardly and then coiled back downwardly onto itself by the apron 70 which in its starting position moves upwardly and rearwardly from the guide members 66 over the cam guide members 56 and then downwardly and forwardly to the sprockets 58. This movement of the apron 70 in the bale chamber 75 effectively starts the core of the roll bale. The rotating stripper roller 76 removes crop material from the apron 70 at the forward end of the bale chamber 75 and delivers it back downwardly into the bale chamber 75. The roll bale increases in diameter lifting the inner course of the apron 70 that extends between the guide members 66 and the sprockets 58 off the cam guide members 56, and expanding the bale chamber 75 from its initial wedge shape to a substantially circular shape. The expansion of the bale chamber 75 results in expansion of the inner course of the apron 70 contacting the peripheral surface of the roll bale and movement of the apron 70 toward its final position shown in FIG. 1. This movement of the apron 70 is accomplished by rotation of the arm assembly 38 in a clockwise direction as viewed in FIG. 1, from its forward position. When the bale reaches its maximum diameter, the apron 70 will be in its final position of FIG. 1 and the arm assembly 38 will have rotated about 65° to its rearward position shown in full lines in FIG. 1. When it is desired to discharge a bale from the machine, the rear frame 26 is raised to its upper position. This stretches the inner course of the apron 70 across the space between the guide members 66 and the sprockets 58 thereby assisting the bale to exit the machine. The bale rotates in a clockwise direction as viewed in FIG. 1 as it exits the base frame 10.

According to the present invention, a stripper bar 90 is mounted on the rear frame 26. The stripper bar 90 extends transversely of the machine and is positioned in close proximity to the floor roller 72 when the rear frame 26 is in the lower position. As seen in FIGS. 2 and 3, the stripper bar 90 is fastened to a transverse angle member 92 by bolts 94 which extend through elongated holes 96 in the stripper bar 90. The angle member 92 is welded to a transverse curved member 98 that is fastened by bolts 100 to the bottom panel 102 of the rear frame 26.

The stripper bar 90 may be adjusted upward or downward within the limits permitted by the elongated holes 96 therein. The stripper bar 90 should normally be adjusted so that its upper edge 91 is close to, but not contacting, generally smooth peripheral surface 73 of the floor roller 72. The preferred clearance between the stripper bar upper edge 91 and the floor roller peripheral surface 73 is about ⅛ inch.

During bale formation, a small amount of crop material may not be carried upwardly from the upper surface of the rotating floor roller 72 by the apron 70 for inclusion in the bale. Such crop material would then be removed from the floor roller 72 by the stripper bar 90. This crop material would then drop down onto the curved member 98 or the bottom panel 102 where it would be engaged by the apron 70 and carried upwardly into the bale chamber 75 for inclusion in the bale. The stripper bar 90 thus serves to minimize the amount of crop material lost from the machine between the floor roller 72 and the apron 70 during bale forming.

The present invention is not limited to use on roll baling machines that employ the particular type of arpon 70. Accordingly, the present invention may be used on roll baling machines employing other types of aprons such as the well known type formed of a series of endless flat belts.

The present invention is also not limited to use on roll baling machines that have expandable bale chambers and accordingly may be used on roll baling machines that have fixed bale chambers.

The following claims are intended to cover all modifications and variations of the preferred embodiment of the present invention without departing from the spirit and scope of the invention.

What is claimed is:

1. In a roll baling machine having a base frame, a rear frame pivotally connected to said base frame, a floor roller rotatably supported on said frame, bale forming means supported on said base and rear frames cooperating with said floor roller to define a bale chamber for forming a roll bale of crop material, said rear frame being pivotally movable between a lower position for formation of a roll bale in said bale chamber and an upper position for discharge of a roll bale from said bale chamber, the improvement comprising:
a stripper bar mounted on said rear frame for removing crop material from said floor roller during formation of a roll bale in said bale chamber, said stripper bar having an edge located proximate to said floor roller when said rear frame is in said lower position.

2. The improvement defined in claim 1, wherein said stripper bar is adjustable to vary the clearance between an edge of said stripper bar and the peripheral surface of said floor roller.

3. The improvement defined in claim 2, wherein said stripper bar has elongated holes therein to permit adjustment.

4. A roll baling machine comprising:
(a) a base frame;
(b) a floor roller rotatably supported on said base frame;
(c) bale forming means supported on said base and rear frames cooperating with said floor roller to define a bale chamber for forming a roll bale of crop material, said rear frame being pivotally movable between a lower position for formation of a roll bale in said bale chamber and an upper position for discharge of a roll bale from said bale chamber; and
(d) a stripper bar mounted on said rear frame for removing crop material from said floor roller during formation of a roll bale in said bale chamber, said stripper bar having an edge located proximate to said floor roller when said rear frame is in said lower position.

5. The roll baling machine defined in claim 4, wherein said stripper bar is located rearwardly of the longitudinal axis of said floor roller.

* * * * *